United States Patent
Handloser et al.

(10) Patent No.: US 11,914,132 B2
(45) Date of Patent: Feb. 27, 2024

(54) SELF-TEACHING MICROSCOPE

(71) Applicant: LEICA INSTRUMENTS (SINGAPORE) PTE. LTD., Singapore (SG)

(72) Inventors: Matthias Handloser, Bodolz/Lindau (DE); Gerald Nitsch, Esslingen/Neckar (DE); Vincent Vaccarelli, Hamburg, NY (US)

(73) Assignee: LEICA INSTRUMENTS (SINGAPORE) PTE. LTD., Singapore (SG)

( * ) Notice: Subject to any disclaimer, the term of this patent is extended or adjusted under 35 U.S.C. 154(b) by 301 days.

(21) Appl. No.: 17/594,182

(22) PCT Filed: Apr. 8, 2020

(86) PCT No.: PCT/EP2020/060059
§ 371 (c)(1),
(2) Date: Oct. 6, 2021

(87) PCT Pub. No.: WO2020/208091
PCT Pub. Date: Oct. 15, 2020

(65) Prior Publication Data
US 2022/0163783 A1     May 26, 2022

(30) Foreign Application Priority Data
Apr. 8, 2019 (EP) .................................. 19167856

(51) Int. Cl.
*G02B 21/36* (2006.01)
*G02B 25/00* (2006.01)

(52) U.S. Cl.
CPC ......... *G02B 21/365* (2013.01); *G02B 21/368* (2013.01); *G02B 25/001* (2013.01)

(58) Field of Classification Search
CPC ... G02B 25/001; G02B 21/368; G02B 21/365
USPC .......................................................... 348/80
See application file for complete search history.

(56) References Cited

U.S. PATENT DOCUMENTS

| | | | |
|---|---|---|---|
| 2003/0147133 A1 | 8/2003 | Engelhardt | |
| 2003/0155494 A1* | 8/2003 | Olschewski | G02B 21/002 250/234 |
| 2004/0190129 A1 | 9/2004 | Peter et al. | |
| 2011/0169936 A1* | 7/2011 | Naiki | G02B 21/365 348/79 |
| 2018/0046759 A1 | 2/2018 | Barral | |

(Continued)

FOREIGN PATENT DOCUMENTS

| | | | | |
|---|---|---|---|---|
| DE | 10057948 A1 * | 7/2001 | ......... | G02B 21/0024 |
| DE | 10057948 A1 | 7/2001 | | |
| EP | 1341023 A2 | 9/2003 | | |

(Continued)

*Primary Examiner* — John W Miller
*Assistant Examiner* — Omer Khalid
(74) *Attorney, Agent, or Firm* — Leydig, Voit & Mayer, Ltd.

(57) ABSTRACT

A system for a microscope includes a display and an input interface. The system is configured to reproduce, in response to a user input to the input interface, a virtual tour of use of the microscope via the display. The system can be applied, for example, for teaching of microscopy at schools and universities.

19 Claims, 2 Drawing Sheets

(56) References Cited

U.S. PATENT DOCUMENTS

2018/0348876 A1\* 12/2018 Banerjee ................ A61B 34/76
2020/0177397 A1\* 6/2020 Harrington ........... H04L 9/3297

FOREIGN PATENT DOCUMENTS

| EP | 1445635 A2 | 8/2004 | |
|---|---|---|---|
| JP | 2000135215 A \* | 5/2000 | |
| JP | 2011108250 A \* | 6/2011 | ............... C12Q 1/48 |
| WO | WO 2016/130424 A1 | 8/2016 | |
| WO | WO-2016130424 A1 \* | 8/2016 | ......... G02B 21/0012 |

\* cited by examiner

SELF-TEACHING MICROSCOPE

CROSS REFERENCE TO RELATED APPLICATIONS

This application is a U.S. National Phase application under 35 U.S.C. § 371 of International Patent Application No. PCT/EP2020/060059, filed on Apr. 8, 2020, and claims benefit to European Patent Application No. EP 19167856.4, filed on Apr. 8, 2019. The International Application was published in English on Oct. 15, 2020, as WO 2020/208091 A1 under PCT Article 21(2).

TECHNICAL FIELD

The invention relates to the field of microscopes and, in particular, system solutions for microscopes. The invention further relates to a method for teaching the use of a microscope.

BACKGROUND

In teaching at schools and universities, the basics of microscopy and the handling of the microscope are currently being taught in order to enable pupils and students to acquire the images to be analyzed later with comparably high quality. Time and resources are allocated to a secondary objective of teaching. These resources are missing at teaching of the actual primary goal of image analysis, and thus, of the focus of the actual content of teaching, e.g. in biology or medicine, also in other areas which require image analysis of microscopic images. In addition, increasing numbers of students at universities are putting teachers at schools and universities under ever greater time pressure.

SUMMARY

In an embodiment, the present disclosure provides a system for a microscope. The system includes a display and an input interface. The system is configured to reproduce, in response to a user input to the input interface, a virtual tour of use of the microscope via the display.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
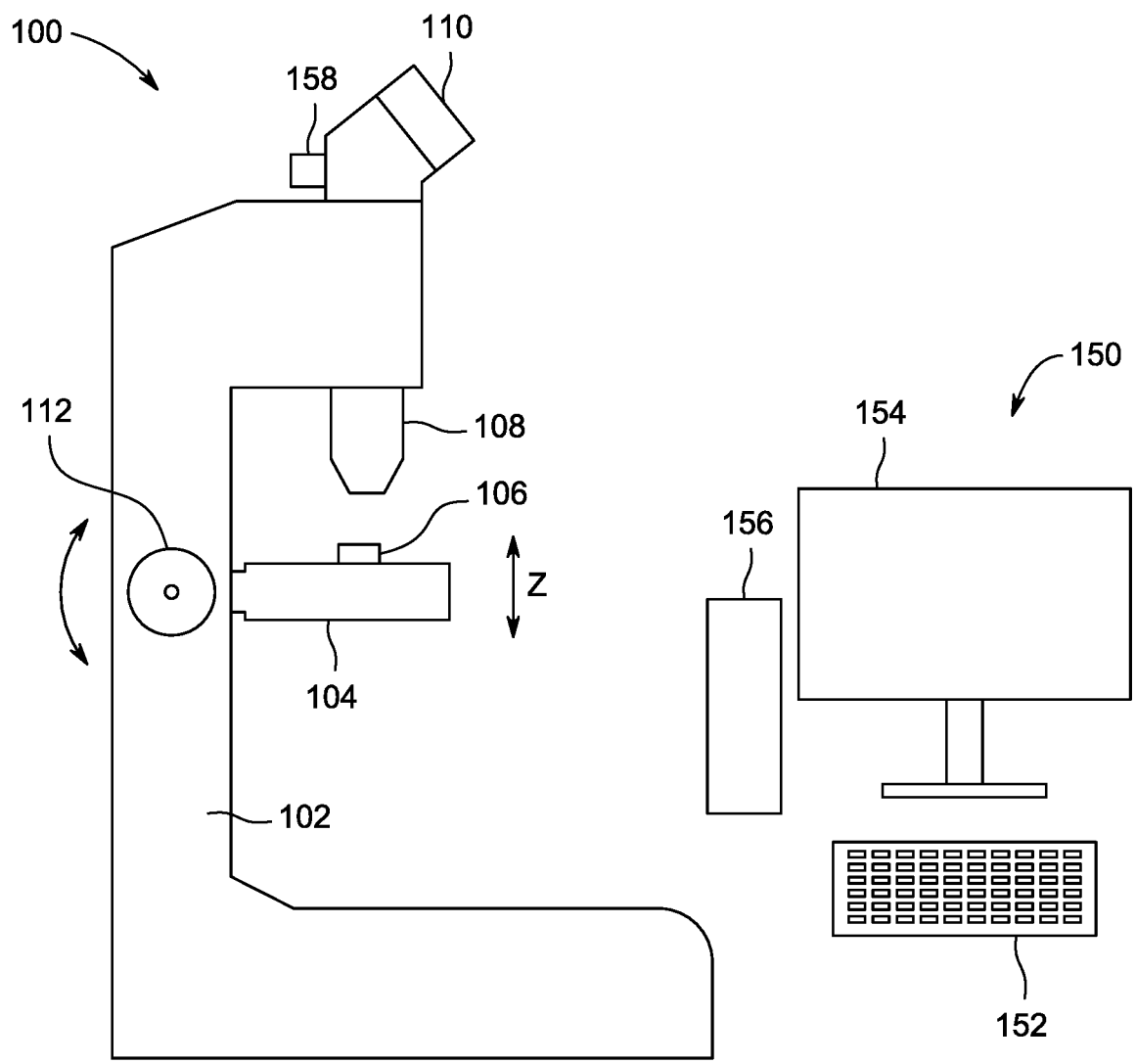
FIG. 1 shows, schematically, a microscope according to the invention in a preferred embodiment.

Embodiments of the present invention provide a system solution for a microscope, a microscope comprising such system solution and a method for teaching the use of a microscope which reduce the amount of resources required for learning microscopy skills.

Embodiments of the present invention provide to reduce the amount of resources required for learning microscopy skills by providing a user of the microscope with individual guidance through the necessary steps of image optimization. An intervention of a teacher is, therefore, no longer necessary in order to learn a fundamental understanding of how a microscope works, through pure interaction with the microscope. This facilitates focusing on the sample to be examined.

An embodiment of the present invention provides a system solution (or an user arrangement) for a microscope, i.e. for the use with a microscope. The system solution comprises a display means and an input interface. The system solution (e.g. one or more processors or processing means thereof) is configured to (or designed to) reproduce (or play or provide) a virtual tour of the microscope (and its use), in response to a user input to the input interface, by means of the display means. The display means can, for example, be connected to an image sensor for displaying the microscope image and also be connected to a network like a university network for displaying course content.

The display means can, for example comprise, one or more displays. Preferably, the display means is configured to display (or overlay) additional information of the virtual tour into the real live image (the image the user is actually seeing or producing, e.g., of a sample) by means of augmented reality or to superimpose it (i.e. the additional information) on the real live image. This could be accomplished by combining text which has a transparent background with the live image. Such a display can be a display separate from the microscope or attached to the microscope, for example in an eyepiece of the microscope. Furthermore, the display means can also include a hybrid eyepiece in which the additional information of the virtual tour is superimposed or displayed on the real live image by means of augmented reality. The input interface can have, for example, one or more keys, e.g. in the form of real keys or a touch screen. Alternatively, voice control or gesture control or similar can be used as input interface. After user input to start the virtual tour, e.g. by pressing a button or by voice or gesture input, the stored tour is started by operating the microscope and the user is, in particular, guided to acquire at least one image in order to achieve the optimal image result in a step-by-step guide. Preferably, the optimal sample image is finally superimposed on the one generated by the user again and again (or repeatedly) until it is matched (i.e., until the optimal sample image and the real live image match each other).

Preferably, the system solution is configured to (or adapted to) generate a feedback to the user of the system solution, in particular, in case that the user deviates from a predetermined sequence of system settings which should have be done (or carried out) by the user (e.g., via the step-by-step guide mentioned before). This could be accomplished by embedding sensors at the user interface points which would detect when positions are moved outside of a specification (e.g., specified positions) or moved in a sequence outside the specification. The feedback can be in the form of at least one of: audio (e.g. voice, beep), video, flashing light, electro-shock and haptic feedback to the user.

Advantageously, the system solution is configured to provide a certificate, for example a winning gift or a test passing certificate, to the user in a test environment (competition for task fulfillment), e.g., within a student class. A microscope network (including a server) with a microscope and system solution for each participant might be used. The provision of the certificate could be in the form of an image pop up or music sound or points deposited into a students' course account.

It is of advantage if the system solution is capable of adjusting operation parts (components or parts used to operate the system solution or the microscope, e.g. a focus drive) depending on the virtual tour, in particular, in a way to make a predetermined sequence of steps or learning easier. In other words, the system solution can be configured to adjust the operation parts (and its way of operation) depending on the virtual tour. For example, in this way the user can easier focus up than down, if that is what the user is supposed to do according to the virtual tour (the same applies to magnification, condenser adjustment, specimen positioning, eyepieces adjustment, etc.). This could be accomplished by using electro-magnets which create a stronger or less strong torque depending on the position of the operation part.

Preferably, the system solution is configured to allow to update or to exchange (for example, by a teacher) the virtual tour, in particular with respect to a teaching sequence or teaching program or the teacher can generate a new teaching template. The Teacher would then have access to a curriculum template on, e.g., the university network whereby he could create the sequence to match his topic of teaching. The student then would access his lab manual from the network and the microscope program would be updated.

Advantageously, the system solution is configured to bring the system solution and/or the microscope into a predetermined condition, in particular, either at startup of the or at shutdown (of the system solution and/or the microscope). A default position of movable settings (e.g.: magnification, focus, condenser) can be programmable, e.g., by the teacher so that the system remembers where to start the session.

It is of advantage if the system solution is configured (e.g., by means of evaluation means) to provide (or determine) quality information about the use or operation of the system solution and/or the microscope, for example, a level of quality of the operation or a level of quality of the images acquired and/or results to be achieved with the system (system solution and/or the microscope). In particular, the evaluation means is also configured to output the level of quality or the quality information, e.g., by means of the display means. The addressee of this output can be the user and/or the teacher. This could be accomplished by a "knowledge check" or examination which can be designed by the teacher and accessible by the student from, e.g., the university network.

The quality information is, preferably, determined by machine learning, deep learning, and/or pattern recognition, or the like. The system solution could then have the appropriate imaging software embedded.

The present invention also relates, in another embodiment, to a microscope (or microscope system) with (or comprising) a system solution or user arrangement as mentioned above. According to this aspect, the system solution or single parts thereof can be embedded into the microscope (or the microscope system).

In a further embodiment, a standard microscope can be equipped with novel eyepieces (for augmented reality) and a control panel (input interface) with e.g. 4-5 buttons can be attached to the side of the microscope base to achieve the above-mentioned functionality.

The invention also relates, in further embodiments, to a method (or procedure) and a computer program for using an above-mentioned system solution or user arrangement Further advantages and embodiments of the invention will become apparent from the description and the appended figures.

As used herein the term "and/or" includes any and all combinations of one or more of the associated listed items and may be abbreviated as "/".

Although some aspects have been described in the context of an apparatus or system, it is clear that these aspects also represent a description of the corresponding method, where a block or device corresponds to a method step or a feature of a method step. Analogously, aspects described in the context of a method step also represent a description of a corresponding block or item or feature of a corresponding apparatus.

It should be noted that the previously mentioned features and the features to be further described in the following are usable not only in the respectively indicated combination, but also in further combinations or taken alone, without departing from the scope of embodiments of the present invention.

In FIG. 1, a microscope 100 according to the invention in a preferred embodiment is, schematically, shown. The microscope 100 comprises a stand or base 102 with an object table 104 being movable in vertical or z-direction by means of a focus drive 112, an objective 108 and an eyepiece 110 (optically connected to the objective 108, e.g., via a lens tube). On the object table, an object or sample 106 to be viewed or examined by means of the microscope 100, is placed.

Further, a system solution 150 according to the invention in a preferred embodiment is provided for the microscope 100. The system solution 150, by means of example, comprises display means 154 in the form of a display or monitor, an input interface 152 in the form of a keyboard and processing means 156 like a PC for carrying out necessary processing steps.

The system solution 150 is configured to reproduce, in response to a user input to the input interface 152, a virtual tour of the use of the microscope 100 by means of the display means 154. Further, the system solution (150) comprises, by means of example, an image sensor 158 to be attached to the microscope 100 in order to acquire an image the user of the microscope 100 is seeing via the eyepiece and to provide that image in the display means.

Figure 2A:
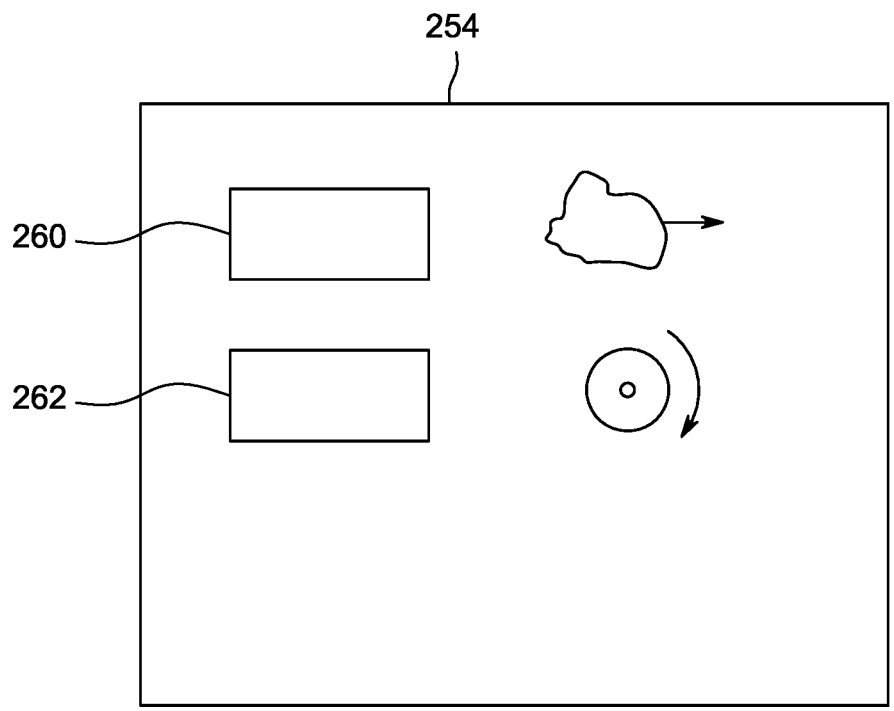
FIGS. 2A and 2B show, schematically, parts of a system solution according to the invention in different, preferred embodiments.

In FIG. 2A, display means 254 as a part of a system solution according to the invention in a preferred embodiment is shown. The display means 254 can correspond to or be used as the display means 154 shown in FIG. 1.

By means of example, a virtual tour of the use of the microscope, e.g. the microscope 100 shown in FIG. 1, is illustrated with two steps 260 and 262, guiding a user to an optimal image of the sample to be viewed.

In the first step 260, instructions of moving the sample in a certain direction, e.g., to the right, can be displayed. In addition, the action or step to be performed by the user can be visually illustrated as shown in FIG. 2A, next to block 260.

In the second step 262, instructions of operating (turning) the focus drive (see FIG. 1) in a certain direction, can be displayed. In addition, the action or step to be performed by the user can be visually illustrated as shown in FIG. 2A, next to block 262. Preferably, the focus drive could be adjusted (e.g., by the use of an electro-magnet) such that the rotation direction, which the user is required to use, is easier to perform than the other (wrong) direction.

Figure 2B:
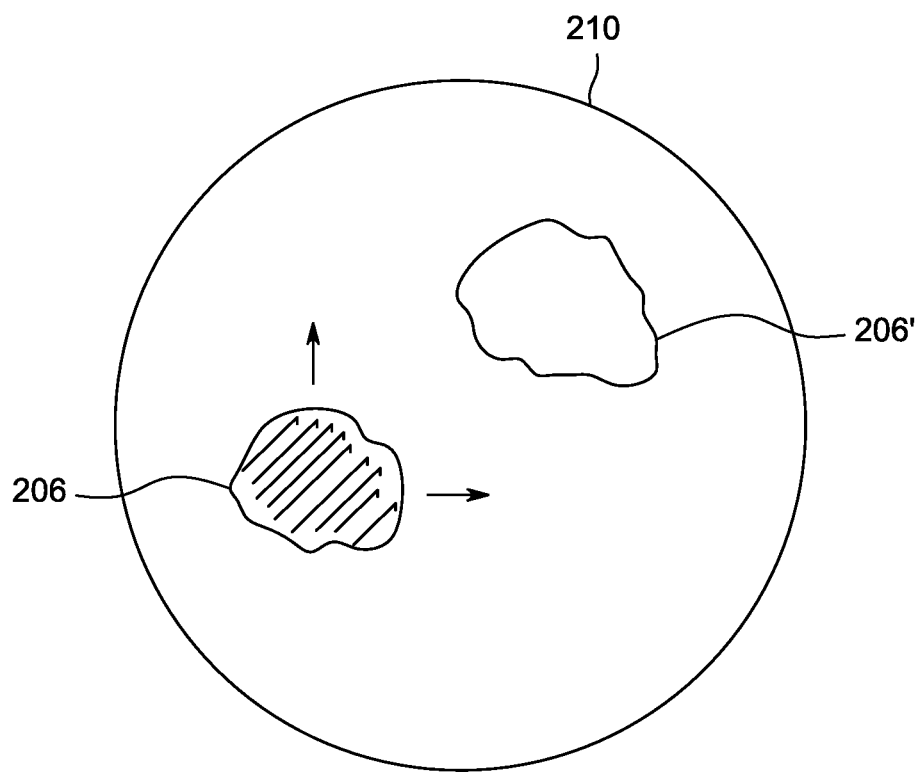

In FIG. 2B, display means 210 as a part of a system solution according to the invention in a further preferred embodiment is shown. The display means 210, by means of example, comprises a hybrid eyepiece (or, alternatively, is integrated into an eyepiece). Such hybrid eyepiece can be used instead of eyepiece 210 of the microscope shown in FIG. 1. In this case, the (hybrid) eyepiece is part of the system solution and (e.g., after attaching or replacing the original eyepiece) of the microscope (with itself can comprise the system solution).

Similar to the instructions of a virtual tour shown in FIG. 2A, instructions or other additional information can be displayed in the display means or hybrid eyepiece and, thus, can be superimposed or added by means of augmented reality to the real live image 206 of the sample to be viewed.

By means of example, instructions in form of arrows (upwards and rightwards) are displayed next to the real live image 206 in order to teach the user to move the sample, which shall be matched with, e.g., an optimal sample image 206', display in the display means 210 or hybrid eyepiece.

Some embodiments relate to a microscope comprising a system as described in connection with one or more of the FIGS. 1, 2A and 2B. Alternatively, a microscope may be part of or connected to a system as described in connection with one or more of the FIGS. 1, 2A and 2B. FIG. 1 shows a schematic illustration of a system 150 configured to perform a method described herein. The system 150 can be part of or be embedded into a microscope 100 and can comprise a computer system 156. The microscope 100 is configured to take images and is connected to the computer system 156. The computer system 156 is configured to execute at least a part of a method described herein. The computer system 156 may be configured to execute a machine learning algorithm. The computer system 156 and microscope 100 may be separate entities but can also be integrated together in one common housing. The computer system 156 may be part of a central processing system of the microscope 100 and/or the computer system 156 may be part of a subcomponent of the microscope 100, such as a sensor, an actor, a camera or an illumination unit, etc. of the microscope 100.

The computer system 156 may be a local computer device (e.g. personal computer, laptop, tablet computer or mobile phone) with one or more processors and one or more storage devices or may be a distributed computer system (e.g. a cloud computing system with one or more processors and one or more storage devices distributed at various locations, for example, at a local client and/or one or more remote server farms and/or data centers). The computer system 156 may comprise any circuit or combination of circuits. In one embodiment, the computer system 156 may include one or more processors which can be of any type. As used herein, processor may mean any type of computational circuit, such as but not limited to a microprocessor, a microcontroller, a complex instruction set computing (CISC) microprocessor, a reduced instruction set computing (RISC) microprocessor, a very long instruction word (VLIW) microprocessor, a graphics processor, a digital signal processor (DSP), multiple core processor, a field programmable gate array (FPGA), for example, of a microscope or a microscope component (e.g. camera) or any other type of processor or processing circuit. Other types of circuits that may be included in the computer system X20 may be a custom circuit, an application-specific integrated circuit (ASIC), or the like, such as, for example, one or more circuits (such as a communication circuit) for use in wireless devices like mobile telephones, tablet computers, laptop computers, two-way radios, and similar electronic systems. The computer system X20 may include one or more storage devices, which may include one or more memory elements suitable to the particular application, such as a main memory in the form of random access memory (RAM), one or more hard drives, and/or one or more drives that handle removable media such as compact disks (CD), flash memory cards, digital video disk (DVD), and the like. The computer system X20 may also include a display device, one or more speakers, and a keyboard and/or controller, which can include a mouse, trackball, touch screen, voice-recognition device, or any other device that permits a system user to input information into and receive information from the computer system X20.

Some or all of the method steps may be executed by (or using) a hardware apparatus, like for example, a processor, a microprocessor, a programmable computer or an electronic circuit. In some embodiments, some one or more of the most important method steps may be executed by such an apparatus.

Depending on certain implementation requirements, embodiments of the invention can be implemented in hardware or in software. The implementation can be performed using a non-transitory storage medium such as a digital storage medium, for example a floppy disc, a DVD, a Blu-Ray, a CD, a ROM, a PROM, and EPROM, an EEPROM or a FLASH memory, having electronically readable control signals stored thereon, which cooperate (or are capable of cooperating) with a programmable computer system such that the respective method is performed. Therefore, the digital storage medium may be computer readable.

Some embodiments according to the invention comprise a data carrier having electronically readable control signals, which are capable of cooperating with a programmable computer system, such that one of the methods described herein is performed.

Generally, embodiments of the present invention can be implemented as a computer program product with a program code, the program code being operative for performing one of the methods when the computer program product runs on a computer. The program code may, for example, be stored on a machine readable carrier.

Other embodiments comprise the computer program for performing one of the methods described herein, stored on a machine readable carrier.

In other words, an embodiment of the present invention is, therefore, a computer program having a program code for performing one of the methods described herein, when the computer program runs on a computer.

A further embodiment of the present invention is, therefore, a storage medium (or a data carrier, or a computer-readable medium) comprising, stored thereon, the computer program for performing one of the methods described herein when it is performed by a processor. The data carrier, the digital storage medium or the recorded medium are typically tangible and/or non-transitionary. A further embodiment of the present invention is an apparatus as described herein comprising a processor and the storage medium.

A further embodiment of the invention is, therefore, a data stream or a sequence of signals representing the computer program for performing one of the methods described herein. The data stream or the sequence of signals may, for example, be configured to be transferred via a data communication connection, for example, via the internet.

A further embodiment comprises a processing means, for example, a computer or a programmable logic device, configured to, or adapted to, perform one of the methods described herein.

A further embodiment comprises a computer having installed thereon the computer program for performing one of the methods described herein.

A further embodiment according to the invention comprises an apparatus or a system configured to transfer (for example, electronically or optically) a computer program for performing one of the methods described herein to a receiver. The receiver may, for example, be a computer, a mobile device, a memory device or the like. The apparatus or system may, for example, comprise a file server for transferring the computer program to the receiver.

In some embodiments, a programmable logic device (for example, a field programmable gate array) may be used to perform some or all of the functionalities of the methods described herein. In some embodiments, a field programmable gate array may cooperate with a microprocessor in order to perform one of the methods described herein. Generally, the methods are preferably performed by any hardware apparatus.

Embodiments may be based on using a machine-learning model or machine-learning algorithm. Machine learning may refer to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. In order for the machine-learning model to analyze the content of an image, the machine-learning model may be trained using training images as input and training content information as output. By training the machine-learning model with a large number of training images and/or training sequences (e.g. words or sentences) and associated training content information (e.g. labels or annotations), the machine-learning model "learns" to recognize the content of the images, so the content of images that are not included in the training data can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. The provided data (e.g. sensor data, meta data and/or image data) may be preprocessed to obtain a feature vector, which is used as input to the machine-learning model.

Machine-learning models may be trained using training input data. The examples specified above use a training method called "supervised learning". In supervised learning, the machine-learning model is trained using a plurality of training samples, wherein each sample may comprise a plurality of input data values, and a plurality of desired output values, i.e. each training sample is associated with a desired output value. By specifying both training samples and desired output values, the machine-learning model "learns" which output value to provide based on an input sample that is similar to the samples provided during the training. Apart from supervised learning, semi-supervised learning may be used. In semi-supervised learning, some of the training samples lack a corresponding desired output value. Supervised learning may be based on a supervised learning algorithm (e.g. a classification algorithm, a regression algorithm or a similarity learning algorithm. Classification algorithms may be used when the outputs are restricted to a limited set of values (categorical variables), i.e. the input is classified to one of the limited set of values. Regression algorithms may be used when the outputs may have any numerical value (within a range). Similarity learning algorithms may be similar to both classification and regression algorithms but are based on learning from examples using a similarity function that measures how similar or related two objects are. Apart from supervised or semi-supervised learning, unsupervised learning may be used to train the machine-learning model. In unsupervised learning, (only) input data might be supplied and an unsupervised learning algorithm may be used to find structure in the input data (e.g. by grouping or clustering the input data, finding commonalities in the data). Clustering is the assignment of input data comprising a plurality of input values into subsets (clusters) so that input values within the same cluster are similar according to one or more (pre-defined) similarity criteria, while being dissimilar to input values that are included in other clusters.

Reinforcement learning is a third group of machine-learning algorithms. In other words, reinforcement learning may be used to train the machine-learning model. In reinforcement learning, one or more software actors (called "software agents") are trained to take actions in an environment. Based on the taken actions, a reward is calculated. Reinforcement learning is based on training the one or more software agents to choose the actions such, that the cumulative reward is increased, leading to software agents that become better at the task they are given (as evidenced by increasing rewards).

Furthermore, some techniques may be applied to some of the machine-learning algorithms. For example, feature learning may be used. In other words, the machine-learning model may at least partially be trained using feature learning, and/or the machine-learning algorithm may comprise a feature learning component. Feature learning algorithms, which may be called representation learning algorithms, may preserve the information in their input but also transform it in a way that makes it useful, often as a pre-processing step before performing classification or predictions. Feature learning may be based on principal components analysis or cluster analysis, for example.

In some examples, anomaly detection (i.e. outlier detection) may be used, which is aimed at providing an identification of input values that raise suspicions by differing significantly from the majority of input or training data. In other words, the machine-learning model may at least partially be trained using anomaly detection, and/or the machine-learning algorithm may comprise an anomaly detection component.

In some examples, the machine-learning algorithm may use a decision tree as a predictive model. In other words, the machine-learning model may be based on a decision tree. In a decision tree, observations about an item (e.g. a set of input values) may be represented by the branches of the decision tree, and an output value corresponding to the item may be represented by the leaves of the decision tree. Decision trees may support both discrete values and continuous values as output values. If discrete values are used, the decision tree may be denoted a classification tree, if continuous values are used, the decision tree may be denoted a regression tree.

Association rules are a further technique that may be used in machine-learning algorithms. In other words, the machine-learning model may be based on one or more association rules. Association rules are created by identifying relationships between variables in large amounts of data. The machine-learning algorithm may identify and/or utilize one or more relational rules that represent the knowledge that is derived from the data. The rules may e.g. be used to store, manipulate or apply the knowledge.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge (e.g. based on the training performed by the machine-learning algorithm). In embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a retina or a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of its inputs (e.g. of the sum of its inputs). The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e. to achieve a desired output for a given input.

Alternatively, the machine-learning model may be a support vector machine, a random forest model or a gradient boosting model. Support vector machines (i.e. support vector networks) are supervised learning models with associated learning algorithms that may be used to analyze data (e.g. in classification or regression analysis). Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

The invention claimed is:

1. A system for a microscope, the system comprising:
a display; and
an input interface;
wherein the system is configured to reproduce, in response to a user input to the input interface, a virtual tour of use of the microscope via the display, wherein the virtual tour is configured to guide a user step-by-step to achieve an optimal image by displaying one or more arrows next to a real live image of a sample on the display, the one or more arrows indicating a desired direction of movement of the sample or a desired direction of adjusting an operation part of the microscope.

2. The system according to claim 1, wherein the display is configured to display additional information of the virtual tour in the real live image by augmented reality, or is configured to superimpose the additional information on the real live image.

3. The system according to claim 1, wherein the system is configured to generate a feedback to a user of the system in a case that the user deviates from a predetermined sequence of system settings which should have been done by the user.

4. The system according to claim 3, wherein the feedback is in the form of at least one of: audio, video, flashing light, electro-shock and haptic feedback to the user.

5. The system according to claim 1, wherein the system is configured to provide a certificate to a user in a test environment.

6. The system according to claim 1, wherein the system is configured so that adjusting the operation part is harder if the user adjusts the operation part in a direction opposite to the desired direction than if the user adjusts the operation part in the desired direction.

7. The system according to claim 1, wherein the system is configured to allow to update or to exchange the virtual tour.

8. The system according to claim 1, wherein the system is configured to bring the system and/or the microscope into a predetermined condition at startup or at shutdown.

9. The system solution to claim 1, wherein the system is configured to provide quality information about use of the system and/or the microscope and to output the quality information.

10. The system according to claim 9, wherein the quality information is determined by machine learning, deep learning, and/or pattern recognition.

11. The system according to claim 1, wherein the display is integrated in an eyepiece for the microscope.

12. The system according to claim 1, wherein the display comprises a hybrid eyepiece which is configured to display additional information of the virtual tour in the real live image by augmented reality, or is configured to superimpose the additional information on the real live image.

13. The system according to claim 1, wherein the system is configured to overlay an optimal sample image with an image generated by the user, and to repeat the overlaying of the optimal sample image with subsequent images generated by the user until the images match each other.

14. A microscope comprising the system according to claim 1.

15. A method for teaching use of a microscope by the system according to claim 1, the method comprising;
   in response to the user input to the input interface, the virtual tour of the use of the microscope is displayed via the display.

16. A tangible, non-transitory computer-readably medium having instructions thereon which, upon being executed by one or more processors, provide for execution of the method according to claim 15.

17. The system according to claim 6, wherein the adjusting of the operation part comprises at least one of adjusting a focus, adjusting a magnification, adjusting a condenser, adjusting a sample position, or adjusting an eyepiece.

18. The system according to claim 6, wherein the system uses one or more electro-magnets to create a stronger torque if the user adjusts the operation part in the direction opposite to the desired direction than in the desired direction.

19. The system according to claim 3, wherein the system is configured to generate the feedback to the user of the system if the sample is moved outside of specified positions or moved in a sequence outside a specification.

\* \* \* \* \*